(12) United States Patent
Hagiwara

(10) Patent No.: US 6,676,616 B1
(45) Date of Patent: *Jan. 13, 2004

(54) INTRAORAL STIMULATING IMPLEMENT

(76) Inventor: Hidenori Hagiwara, 9-17, Ohoka 3-chome, Minami-ku, Yokohama-shi Kanagawa-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/763,890

(22) PCT Filed: Mar. 1, 2000

(86) PCT No.: PCT/JP00/01202

§ 371 (c)(1),
(2), (4) Date: Feb. 28, 2001

(87) PCT Pub. No.: WO00/53023

PCT Pub. Date: Sep. 14, 2000

(30) Foreign Application Priority Data

| Mar. 9, 1999 | (JP) | ............................................ 11-062311 |
| Jul. 15, 1999 | (JP) | ............................................ 11-202346 |
| Feb. 14, 2000 | (JP) | ........................................ 2000-035051 |

(51) Int. Cl.⁷ ............................................... A61H 13/00
(52) U.S. Cl. ........................ 601/139; 128/859; 128/861
(58) Field of Search ................................. 128/851, 848, 128/859–862; 606/234, 235; 601/38; 206/800; 536/114; D1/127; 426/87, 89, 104, 103, 249, 449, 516; D18/24; 602/902

(56) References Cited

U.S. PATENT DOCUMENTS

| 1,552,301 | A | * | 9/1925 | Hogan | |
| 1,855,145 | A | * | 4/1932 | Jones | 426/87 |
| 3,093,093 | A | * | 6/1963 | Ryan et al. | 107/19 |
| 3,805,771 | A | * | 4/1974 | Wright | 128/62 A |
| D239,415 | S | * | 3/1976 | Harris | D18/24 |
| 4,778,683 | A | * | 10/1988 | Newsteder | 426/249 |
| 5,052,410 | A | * | 10/1991 | Stubbs | 128/859 |
| D327,086 | S | * | 6/1992 | Stahl | D18/30 |
| 5,147,669 | A | * | 9/1992 | Crothers | 426/94 |
| D338,032 | S | * | 8/1993 | Wagers | D18/24 |
| 5,447,584 | A | * | 9/1995 | Shakespeare et al. | 156/256 |
| 5,538,742 | A | * | 7/1996 | McHale et al. | 426/5 |
| 5,556,357 | A | * | 9/1996 | Hanna | 428/11 |
| 6,217,606 | B1 | * | 4/2001 | Portonoy et al. | 607/96 |
| 6,263,877 | B1 | * | 7/2001 | Gall | 128/848 |
| 6,273,780 | B1 | * | 8/2001 | Gardner | 426/104 |
| 6,446,631 | B1 | | 9/2002 | Hagiwara | 128/848 |

OTHER PUBLICATIONS

Chidren's ABC chewable vitamins (product publication).*

* cited by examiner

Primary Examiner—Michael A. Brown
(74) Attorney, Agent, or Firm—Finnegan Henderson Farabow Garrett & Dunner, L.L.P.

(57) ABSTRACT

To provide an intraoral stimulating implement which is provided with at least a mounting portion which is mounted on between a part of the teeth and a part of lips and a pressing portion which is integrally fixed to the mounting portion so that it presses an affected part to be pressed for treatment from inside the mouth in response to biting action of the upper and lower teeth, and can be used with ease even by parsons who feel a sense of incompatibility to introduction of a foreign matter into the mouth or dislike introducing a foreign matter into the mouth, and is suitable for use on a street.

20 Claims, 2 Drawing Sheets

INTRAORAL STIMULATING IMPLEMENT

FIELD OF THE INVENTION

This invention relates to an intraoral stimulating implement for pressing various points, a jaw articulation, or the like from inside the mouth for various treatment.

BACKGROUND OF THE INVENTION

In oriental medicine, it has been known that there are a plurality of points on the face as shown in FIG. 5 and the patient can be recovered from various indisposition by stimulating a particular point with a needle or moxa.

For example, by stimulating Geikou points C located between the middle points of the outer peripheries A of the nosewings and the nasolabial folds B (i.e. folds on opposite sides of the nose), olfaction abnormalities, nasal congestion and the like can be cured. Symptoms of nasitis can be cured by stimulating Biryu points D or Sanshou points E. The Biryu points D are located at the middle points of straight lines joining the nostril, the nasal septum columella and the nosewing, and the Sanshou points are located at the middle points of the nasolabial folds below the Geikou points C. Further, by stimulating Koryou points F located at 3 cm outward from the nosewings, symptoms of nasal catarrh, trigeminal neuralgia and facial paralysis can be lightened.

When one opens the mouth wide with the right and left hands applied to the right and left jaw articulations, one can feel parts moving largely. When one suffers from an articular disease at the jaw or symptom of bruxism, the inside of the parts is stiff and strain of muscles is observed. In such a case, by pressing the jaw articulation rearwardly upward from behind the root of the upper and lower teeth with a finger, strain of the affected part is lightened, whereby various feelings of physical disorder such as a feeling that the jaws are wobbly, a feeling of oppression and pain when biting strongly can be lightened.

Since it is impossible to successfully press the Geikou point C, Koryou point F, and the like from the surface of the face for a long period, stimulation of such points has to be performed by a specialist. Similarly, it is impossible to press the jaw articulation with a finger for a long time from the inside of the mouth, stimulation of the jaw articulation also has to be performed by a specialist.

This applicant has proposed an intraoral stimulating implement which makes it feasible to stimulate, without relying on a specialist, various points or the jaw articulation without causing a sharp pain so that various remedial values can be expected (Japanese Unexamined Patent Publication No. 10(1998)-28755). The intraoral stimulating implement comprises a mounting portion which is mounted on at least a part of the teeth and a pressing portion which is integrally fixed to the mounting portion so that it can press an affected part to be pressed for treatment from inside the mouth in a state where the mounting portion is mounted on the teeth.

Since the intraoral stimulating implement comprises a pressing portion which can press an affected part and is integrally fixed to a mounting portion, anybody can easily and effectively stimulate from inside the mouth an affected part near the mouth for the purpose of various remedial values by only mounting the intraoral stimulating implement of this invention on the teeth.

However, the intraoral stimulating implement is disadvantageous in that it is difficult to use for persons who feel a sense of incompatibility to introduction of a foreign matter in the mouth or dislike introducing a foreign matter in the mouth, and it is not suitable for use on a street.

In view of the foregoing observations and description, the primary object of the present invention is to provide an intraoral stimulating implement which can be used with ease even by persons who feel a sense of incompatibility to introduction of a foreign matter into the mouth or dislike introducing a foreign matter into the mouth and which is suitable for use on a street.

SUMMARY OF THE INVENTION

The intraoral stimulating implement (confectionary) in accordance with the present invention is characterized by having at least a mounting portion which is mounted on between a part of the teeth and a part of lips and a pressing portion which is integrally fixed to the mounting portion so that it presses an affected part to be pressed for treatment from inside the mouth in response to biting action of the upper and lower teeth.

Further, the intraoral stimulating implement (confectionary) in accordance with the present invention is characterized in that the mounting portion is arranged to be mounted in a recess of the lower jaw between the lower teeth and the lower lip while the pressing portion is arranged to be positioned in a recess of the upper jaw between the upper teeth and the upper lip, the pressing portion being shaped to be able to press upward the "Geikou" point, the "Biryu" point and/or the "Sanshou" point from inside the upper lip.

The intraoral stimulating implement of the present invention may be arranged so that the mounting portion is mounted in a recess of the lower jaw between the lower teeth and the lower lip while the pressing portion is positioned in a recess of the upper jaw between the upper teeth and the upper lip, the pressing portion being shaped to be able to press upward the "Koryou" point from inside the upper lip.

The intraoral stimulating implement of the present invention may be arranged so that the mounting portion is mounted in a recess of the lower jaw between the lower teeth and the lower lip while the pressing portion is positioned in a recess of the upper jaw between the upper teeth and the upper lip, the pressing portion being shaped to be able to press upward the jaw articulation from inside the mouth.

It is preferred that the intraoral stimulating implement be provided at its peripheral portion with a cutaway portion for accommodating the upper lip frenulum between the gingival and the lip. It is preferred that intraoral stimulating implement is 1 to 3 mm in thickness. The mounting portion may be horizontally symmetric or vertically symmetric.

It is preferred that the intraoral stimulating implement of this embodiment be in the form of a plate-like confectionary such as chewing gum or chewing candy which is rigid at normal temperatures and is softened when chewed in the mouth.

The intraoral stimulating implement of the present invention may be in the form of candy, chocolate, rice cracker or biscuit.

The affected part to be pressed for treatment is a part such as a point, an articulation and the like pressing on which is expected to be effective for treatment.

The intraoral stimulating implement (confectionary) in accordance with the present invention may be formed of a material such as chewing gum which is rigid at normal temperatures and is flexible not to damage the inside of the mouth. Further the intraoral stimulating implement of the present invention may be arranged to be disposable, to be reusable or to be edible. Perfumery such as mint may be added.

The intraoral stimulating implement in accordance with the present invention can be used with ease without feeling a sense of incompatibility or resistance to introduction into the mouth and can be used on a street with no problem.

Since the intraoral stimulating implement of this invention comprises a pressing portion which can press an affected part and is integrally fixed to a mounting portion, anybody can easily and effectively stimulate from inside the mouth an affected part near the mouth for the purpose of various remedial values by only mounting the intraoral stimulating implement of this invention on the teeth. Further the intraoral stimulating implement of this invention is preferable also from the viewpoint of beauty since it does not leave no traces of treatment on the face unlike moxa treatment.

When the pressing portion is shaped to be able to press upward the "Geikou" point from inside the upper lip, olfaction abnormalities, symptoms of running nose due to cold or hay fever, nasal congestion and the like can be cured. It is especially effective to hay fever.

When the pressing portion is shaped to be able to press the "Biryu" point or the "Sanshou" point, symptoms of nasitis can be lightened, and when the pressing portion is shaped to be able to press the "Koryou" point, symptoms of nasal catarrh, trigeminal neuralgia and facial paralysis can be lightened.

When the pressing portion is shaped to be able to press the jaw articulation behind the root of the upper and lower teeth, anybody can easily and effectively press the jaw articulation to obtain a finger-pressure cure effect and continue movement massage for a long time as will be described later, whereby strain of the affected part is lightened and various feelings of physical disorder can be lightened.

Further, when the intraoral stimulating implement of this invention is in the form of edible confectionary or gum, even persons who feel a sense of incompatibility to introduction of a foreign matter into the mouth or dislike introducing a foreign matter into the mouth can easily use it and at the same time it can be used with no problem on a street.

PREFERRED EMBODIMENTS OF THE INVENTION

Embodiments of the present invention will be described in detail with reference to the drawings, hereinbelow.

Figure 1A:
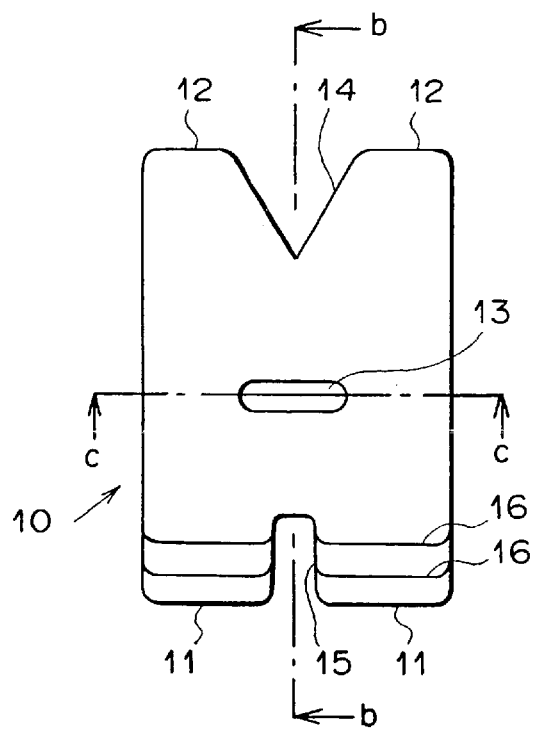
FIG. 1A is a front view showing an intraoral stimulating implement in accordance with a first embodiment of the present invention.
Figure 1B:
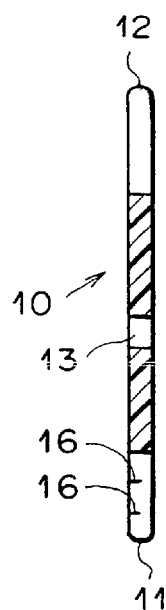
FIG. 1B is a cross-sectional view taken along line b—b in FIG. 1A.
Figure 1C:
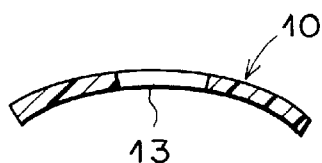
FIG. 1C is a cross-sectional view taken along line c—c in FIG. 1A.

FIGS. 1A, 1B, and 1C are views showing an intraoral stimulating implement in accordance with a first embodiment of the present invention. FIG. 1A is a front view showing an intraoral stimulating implement in accordance with a first embodiment of the present invention. FIG. 1B is a cross-sectional view taken along line b—b in FIG. 1A. FIG. 1C is a cross-sectional view taken along line c—c in FIG. 1A.

The intraoral stimulating implement 10 of this embodiment is shaped so that it is mounted in the mouth and presses an affected part to be pressed for treatment from inside the mouth in response to biting action of the upper and lower teeth. As shown in the drawings, the intraoral stimulating implement 10 comprises a mounting portion 11 to be mounted between teeth 3, 4 and lips 1, 2, e.g., on a front portion of the upper teeth 3 and a pair of pressing portions 12 which are integrally fixed to the mounting portion 11 and presses an affected part to be pressed for treatment from inside the mouth in response to biting action of the upper and lower teeth 3 and 4. For example, the intraoral stimulating implement 10 is in the form of a plate-like member formed of a material which is rigid at normal temperatures and is softened when chewed in the mouth. For example, such a material can be obtained by mixing emulsifier, gelatine, size or the like to gum base or thick malt syrup. However, the intraoral stimulating implement 10 may be in the form of a plate-like member formed of material which can be repeatedly used in place of the material which can be softened. The pressing portions 12 are spaced from each other in the transverse direction of the intraoral stimulating implement 10 so that the distance between the centers of the tip portions of the respective pressing portions 12 is about 40 mm. The intraoral stimulating implement 10 is provided at the center thereof with an air intake opening 13 which prevents the user from having difficulty in breathing when he or she mounts the intraoral stimulating implement 10 in the mouth so that the pressing portions 12 press an affected part to be pressed for treatment. Further, the intraoral stimulating implement 10 is provided at its upper edge between the pressing portions 12 with a cutaway portion 14 for accommodating the upper lip frenulum 6 (See FIG. 3) between the gingival and the lips 1 and 2. This is for preventing the pressing portions 12 from repeatedly pushing the upper lip frenulum 6 and paining the user. The intraoral stimulating implement 10 is further provided with a cutaway portion 15 at the lower edge of the mounting portion 11. Similar cutaway portions 14 or 15 may be provided at all of the four sides of the intraoral stimulating implement 10 so that the intraoral stimulating implement 10 may be inverted or held sideways in the mouth. The intraoral stimulating implement 10 is 1 to 3 mm in thickness. A plurality (two in FIG. 1) of transverse grooves 16 are formed in the mounting portion 11. The grooves 16 are for cutting the intraoral stimulating implement 10 to a desired length, for example, for the use of children.

Figure 3:
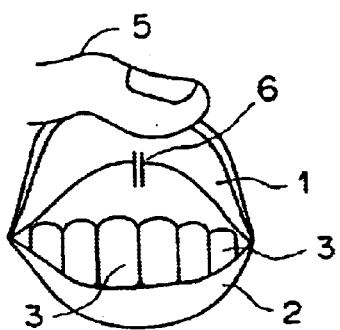
FIG. 3 is a schematic view showing the upper lip frenulum.

FIG. 3 is a view showing the upper lip frenulum 6 between the gingival of the upper teeth 3 and the upper lip 1 with the upper lip 1 forced upward by a finger so that the upper lip frenulum 6 is exposed. The lower teeth 4 are behind the lower lip 2.

Figure 4:
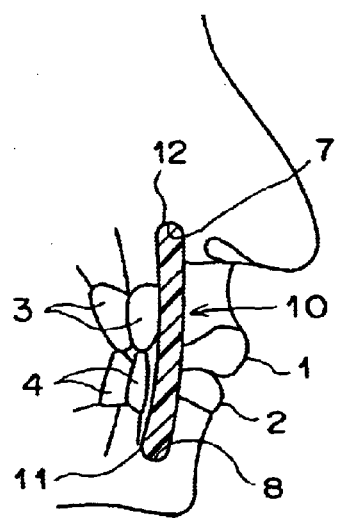
FIG. 4 is a front view showing the intraoral stimulating implement shown in FIG. 1 as mounted in the mouth.
Figure 5:
FIG. 5 is a view showing positions of points called "Geikou", "Biryu", "Sanshou" and "Koryou".

FIG. 4 shows a state where the intraoral stimulating implement 10 is mounted in the mouth.

As can be understood from the description above, the mounting portion 11 is mounted in a recess 8 of the lower jaw between the lower teeth 4 and the lower lip 2 while the pressing portions 12 are positioned in a recess 7 of the upper jaw between the upper teeth 3 and the upper lip 1, and accordingly, in response to biting action of the upper and lower teeth 3 and 4, the mounting portion 11 is lifted upward in contact with the bottom of the recess 8 in the lower jaw and the pressing portions 12 integrated with the mounting portion 11 pushes upward the ceiling of the recess 7 in the upper jaw. As a result, the pressing portions 12 press upward the "Geikou" point C, C from inside the upper lip 1. It is possible to press the "Biryu" point and/or the "Sanshou" point from inside the upper lip 1. Further, the mounting portions 12 may be shaped to press upward the "Koryou" point from inside the upper lip 1. In this case, when olfaction abnormalities occur, the nose keeps running due to cold or hay fever, or nasal congestion occurs, such a symptom can be cured.

Figure 2:
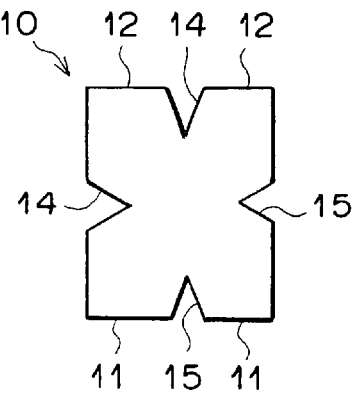
FIG. 2 is a front view showing an intraoral stimulating implement in accordance with a second embodiment of the present invention.

FIG. 2 is a front view showing an intraoral stimulating implement in accordance with a second embodiment of the present invention.

In the second embodiment, all of the four sides of the intraoral stimulating implement 10 are provided with cut-away portions. With this arrangement, the intraoral stimulating implement 10 can be rotated in the mouth without causing the pressing portions 12 to impact against the upper lip frenulum 6.

What is claimed is:

1. An intraoral implement for stimulating a predetermined portion of a face, consisting essentially of a plate member having four sides, the plate member comprising:

means for mounting a first side of the four sides of the plate member between lower teeth and a lower lip of the face;

means for pressing at least two pressure points selected from the group consisting of Geikou points, Biryu points, Sanshou points, Koryou points, and jaw articulations, the means for pressing positioned on a second side of the four sides, opposite from the first side of the four sides, and configured to be receivable between upper teeth and an upper lip of the face; and the means for mounting and the means for pressing being spaced at a height such that, when the means for mounting is received between the lower teeth and the lower lip and upon a biting action of upper and lower jaws, the means for pressing presses upwardly against the at least two pressure points selected from the group consisting of Geikou points, Biryu points, Sanshou points, Koryou points, and jaw articulations.

2. An intraoral implement as defined in claim 1, wherein the means for pressing includes a pair of pressing portions, wherein the plate member further comprises a cutout portion formed between the pair of pressing portions.

3. An intraoral implement as defined in claim 1, wherein the plate member is substantially rectangular in shape with a cutout portion formed in a substantially mid-portion of each of the four sides.

4. An intraoral implement as defined in claim 1, wherein the plate member has a thickness ranging from 1 to 3 mm.

5. An intraoral implement as defined in claim 1, wherein the plate member is symmetric with respect to a vertical centerline thereof.

6. An intraoral implement as defined in claim 1, wherein the plate member is symmetric with respect to a horizontal centerline thereof.

7. An intraoral implement as defined in claim 1, wherein the plate member is a confectionary.

8. An intraoral implement as defined in claim 1, wherein the plate member is formed of a material that is substantially rigid outside the mouth and substantially soft inside the mouth.

9. An intraoral implement as defined in claim 1, wherein the plate member is formed of a reusuable material.

10. An intraoral implement as defined in claim 1, wherein the plate member is formed of an edible material.

11. An intraoral implement as defined in claim 1, wherein the plate member includes at least one removable portion for reducing the height between the means for mounting and the means for pressing.

12. An intraoral implement as defined in claim 11, wherein the plate member includes at least one groove defining the at least one removable portion.

13. An intraoral implement as defined in claim 12, wherein the at least one groove is substantially parallel to at least one of the first and second sides.

14. An intraoral implement as defined in claim 1, wherein a third side has another means for pressing and a fourth side has another means for mounting, the height between the means for mounting and the means for pressing being different from the height between the other means for mounting and the other means for pressing.

15. An intraoral implement as defined in claim 1, wherein the plate member further comprises an opening for air intake.

16. A method of stimulating a predetermined portion of a face from inside a mouth, comprising:

inserting the intraoral implement of claim 1 in the mouth;

placing the means for mounting between the lower teeth and the lower lip;

placing the means for pressing between the upper teeth and the upper lip; and biting upper and lower jaws together to press upwardly against at least two pressure points selected from the group consisting of Geikou points, Biryu points, Sanshou points, Koryou points, and jaw articulations.

17. A method of stimulating a predetermined portion of a face from inside a mouth, comprising:

providing a plate member having a mounting portion and a pressing portion;

placing the plate member between the teeth and the lips, such that the mounting portion is received between the lower teeth and the lower lip and the pressing portion is received between the upper teeth and the upper lip; and pressing upwardly against at least one pressure point selected from the group consisting of Geikou point, Biryu point, Sanshou point, Koryou point, and jaw articulation by biting upper and lower jaws together.

18. A method as defined in claim 17, wherein the plate member is substantially rectangular in shape with four sides.

19. A method as defined in claim 18, wherein the plate member includes a pair of pressing portions on one side of the four sides, the pair of pressing portions being configured to press at least two pressure points selected from the group consisting of Geikou points, Biryu points, Sanshou points, Koryou points, and jaw articulations upon biting upper and lower jaws together.

20. A method as defined in claim 18, wherein the plate member includes a cutout portion formed in a substantially mid-portion of each of the four sides.

* * * * *